June 17, 1930.   H. C. HARVEY ET AL   1,763,653
RESIN COATED PULP BOARD
Filed June 14, 1926
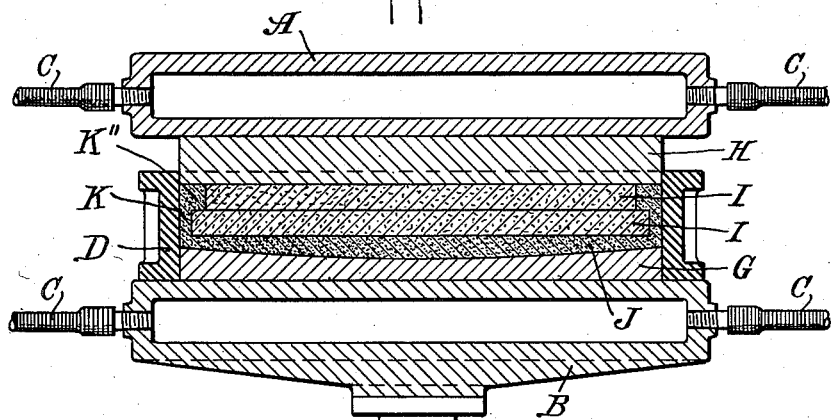
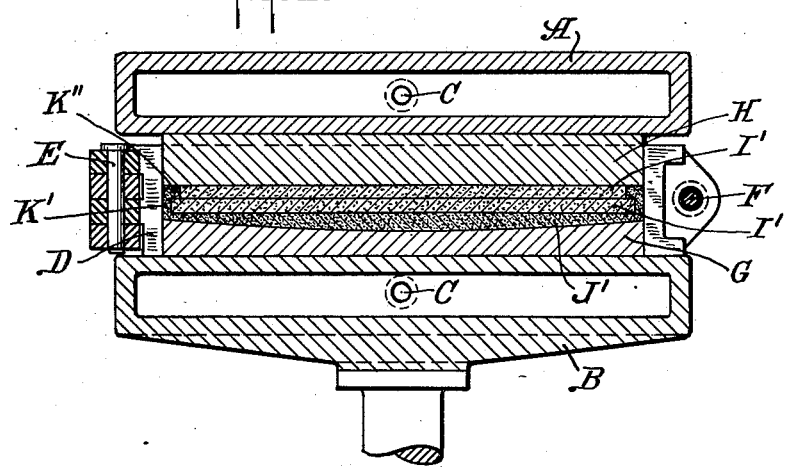
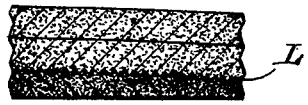
WITNESS
G. V. Rasmussen
INVENTORS
HAROLD C. HARVEY
HUBERT L. BECHER
BY
ATTORNEYS Patented June 17, 1930

1,763,653

UNITED STATES PATENT OFFICE

HAROLD C. HARVEY AND HUBERT L. BECHER, OF TRENTON, NEW JERSEY, ASSIGNORS TO THE AGASOTE MILLBOARD COMPANY, A CORPORATION OF NEW JERSEY

RESIN-COATED PULPBOARD

Application filed June 14, 1926. Serial No. 115,709.

Our invention relates to an article of manufacture comprising a base of compressed fibres having firmly attached thereto a layer of molded, artificial resin, and to the method of producing such article. Our method comprises, broadly speaking, the application of an artificial resin while still in its incomplete state to a pulp board in spongy condition, compacting the board and bringing the resin into its final so-called infusible and insoluble state by one operation by which both board and resin are subjected simultaneously to the necessary degree of heat and pressure.

Pulp board is usually made by running paper pulp, wood pulp or the like, preferably with admixture of a suitable binder, into a mold and, by means of pressure, removing the majority of the water (see for instance United States Patents Nos. 971,936, 1,272,566 and 1,506,509) and subsequently drying out the remainder of the water by the application of heat, preferably in a suitably constructed drier. The board, after substantially all the water has been removed, is in what we term a spongy condition and is then subjected to heat and pressure to form a compact board. This board when in this spongy condition is referred to in the claims as "sponge board". Artificial resin is, generally speaking, a condensation product of phenol or other organic substance obtained from petroleum or coal tar, and formaldehyde, a typical example of which is the phenol aldehyde which can be obtained in the market in an incomplete state in which it is still fusible and soluble, and is subjected, preferably in a mold, to the combined action of heat and pressure, the application of heat resulting in bringing the resin into its final stage in which it is, for all practical purposes, insoluble and infusible, the application of pressure preventing the formation of gas bubbles or pores. The artificial resin may be obtained in the market in various forms.

While it has been suggested that artificial resin may be used as a surface coating for wood, cement and other substances, either by applying the resin in the form of a varnish, or by dipping into it the article to be coated, it has not proven practical to coat a pulp board base with more than a comparatively thin film or layer, as artificial resin has a strong tendency to warp and if applied in a layer of substantial thickness will tend to warp the base.

In carrying out our invention, we place upon a base of spongy, that is to say, as yet uncompressed, pulp board, a layer of artificial resin, preferably in the form of a molding compound that is admixed with wood flour and/or other filler which is still in the fusible condition, and then subject the resin and the pulp board simultaneously to heat and pressure sufficient to compact the board and to render the resin substantially infusible and nonporous. The molding compound may be in granulated or sheet form. We may also apply a layer of artificial resin varnish to the pulp board before applying the compound thereto. The thickness and strength of the compacted board will have to be sufficient to prevent any substantial warping of the resin layer.

Before shaping our pulp board we incorporate with the fibres a suitable fusible binder, such as asphalt, gilsonite, elaterite or red (accaroid) gum, having a low coefficient of expansion so as to prevent, as far as possible, the likelihood of so great an extent of expansion or contraction of the finished board as would be liable to crack or otherwise disturb the resin coating.

In order to obtain a smooth surface finish and prevent any explosion by the steam which may be formed by moisture left in the board, either purposely or otherwise, we cool the board to a sufficiently low temperature before releasing the pressure therefrom.

Among the advantages of our process are that we subject the resin and the board at the same time to the heat and pressure necessary to complete the molding of the resin and the compacting of the board, thus forming our completed article without the application of any more or appreciably more heat and pressure than would be necessary for the completion of the molding alone. We employ as a base a material to which the high pressure needed for the molding of the resin may be applied not only without injury but with advantage and which is capable of withstanding without injury the relatively sudden change in temperature due to cooling.

Our invention, broadly speaking, is not limited to the coating of a spongy base in the form of flat sheets but is obviously applicable to any spongy base to which resin may be applied and which may be finished by compression with suitable instrumentalities. We may also, instead of placing the resin upon the board, place the board upon or against the resin in a mold and subject the resin and board to pressure in such a direction that each will be pressed against the other. Other things being equal, we prefer to place the board upon the resin, especially if the latter contains coloring matter which has a tendency to settle during the molding process, such settling thus carrying the coloring matter towards, instead of away from, the surface.

As the base is in spongy or porous condition the resin, which will fuse before the base is fully compressed, will enter the pores of the base and will thus cause an interlocking of the completed base and the completed resin layer by what we term a surface lock.

We have found that there is still some liability of warping in connection with a board of substantial size when made in accordance with the method hereinabove described. We have not been able as yet to determine whether this warping is due to a shrinking of the resin or to a stress in the compacted pulp board caused by exposing one side thereof but not the other to the influence of the atmosphere, or to both; but the warping is due in all probability to at least one of these two possible causes. It might, therefore, be advisable to coat each side of the pulp board with a resin layer, the resin layers being substantially of equal thickness, other things being equal. If the warping is due to a shrinking of the resin, the two layers of resin would tend to neutralize each other with respect to tension, while the protection of both sides of the board by resin would prevent an unequal atmospheric influence. Resin, however, is a very expensive material, and a board which is resin-coated on both sides would therefore, under ordinary circumstances, be too costly. We have, however, invented a method for taking advantage of the tendency of our board to warp, to produce a board, which, while provided with a layer of resin on one side only, will maintain the upper surface of the resin in a plane. We select a piece of sponge-board of a thickness that will result in a compacted board of desired thickness and provide this with a layer of resin in the manner hereinabove described. After compaction, we subject the finished board for a suitable length of time, for instance, one month, to such atmospheric conditions as it is likely to meet at the point of use. We note the nature and the extent of the resulting warping. We then make a mold-bottom, having its molding surface concaved in such a manner and to such an extent that the compacted resin layer, if removed from the completed board, would fit therein fairly closely. We then place enough resin on the bottom of this mold to form, after compaction, a body of compressed resin substantially equal to the body of resin which would be formed, if the compacted resin layer of our trial board has its concaved portion filled with compacted resin, so that the exposed surface of the resin layer would lie substantially in a plane. Upon the loose resin placed in the bottom of the mold as thus described, we place a layer of sponge board and then compact board and resin with heat and pressure as hereinabove described. The resulting board will then, as it warps, draw the exposed surface of the resin into a plane while the additional thickness of resin extending, not as might be supposed, above the general level of the exposed side of the resin layer, but in the opposite direction, will cause a cupping of the adjacent pulp board. The lower exposed portion of the compacted pulp board may be rendered convex but this is not a disadvantage in connection with most uses to which our resin coated board is to be put. If desired, such portion may be machined to plane form.

In the drawings forming part of this application, we have illustrated a method of carrying out the improvement last described in connection with the manufacture of a circular table top. In these drawings Fig. 1 represents a vertical cross section of two platens of a hot press and between them two sheets of spongy pulp board, one of them having applied thereto a layer of molding compound in granulated form, while Fig. 2 is a vertical cross section at right angles to Fig. 1 showing the sheets of spongeboard compacted and the resin layer fused. Fig. 3 shows the board after it has been removed from the press and has cooled, and Fig. 4 an enlarged portion thereof lying between the lines 4—4, 4—4 of Fig. 3. A and B represent respectively, the upper and lower platen of a hot press each provided with a steam chamber, C indicating the conduits for carrying steam or cold water to such steam chambers. D represents the circular mold sides swinging on hinge E and provided with the usual locking ears and bolt F. G is the mold-bottom concaved in the manner hereinabove described. H is the mold top fitted to slide closely within the mold sides D. I—I are two sheets of sponge board between which there is an adhesive placed, preferably a coating of resin varnish. A single piece of sponge board I may be employed but we have found that it is easier and more practicable to build up the board of more than one layer to produce sponge board having the desired thickness. J represents a body of granulated molding resin (containing the usual wood flour filler) placed between the sponge board and the mold-bottom G, while K represents a circular body of molding compound which fills the space lying between the circumferences of the pieces I—I and the mold sides D—D.

When the parts are in the position shown in Fig. 1, pressure and heat are applied until the resin is fused and the sponge board has been compacted. Fig. 2 shows the parts of the apparatus and the board after the completion of the pressing operation, the layers I—I, now compacted, being designated as I'—I' and the resin covering as J'—K'. When sufficient heat and pressure have been applied, the platens of the hot press are flooded with water for a length of time sufficient to cool the board below 212° F. The platen A is then raised, the mold sides D are opened, the top H is removed, and the compacted board is lifted away from the mold-bottom G and permitted to cool to room temperature.

When two sheets are used, the upper sheet I, Fig. 1 may very conveniently be made with a smaller circumference than the lower sheet, thus permitting the formation of a strengthening bead K'' on the circular resin body of K'.

The following will serve as a more specific example of our method:

The two pieces of sponge board I are, respectively 24 and 23½ inches in diameter and 1⅝ inches in thickness, and contain fifty per cent (50%) by weight of mineral pitch or accaroid gum. A film of resin varnish is placed between them and also on the outside of the larger layer I. The resin layer J is of such a depth that the completed layer J' will at the center be about 5/32 inch and at the circumference 2/32 inch. The resin and board are subjected to a pressure of fifteen hundred pounds to the square inch for thirty minutes and thereafter the platens are filled with cool water for 15 minutes. The pressure is then released and the finished board cooled to room temperature. The outer surface of the resin layer will be found to be a plane.

We have not yet determined whether this phenomenon, that is, the immediate warping of the board, is due to the fact that the board when cooling is subjected to the restraining influence of the circular ring K' formed by the hardened resin but we are inclined to the belief that such influence compels an immediate distortion, slight but visible, of the board layers I'—I' as they cool. At any rate, it is not necessary, so far as we have as yet been able to determine, to await the result of atmospheric influence before the outer surface of such a resin layer forms a plane. The surface lock herein above referred to between the resin and the pulp board is indicated at L, Fig. 4.

The molding compound used by us may be colored in accordance with the color effect to be produced. We have discovered that molding compound may be provided with fast colors, insoluble in the resin by dyeing the filler, for instance the wood flour, before adding the resin thereto.

We claim:

1. As an article of manufacture a warped base of compressed fibre intermingled with a fusible binder having a relatively low coefficient of expansion, said warped base having firmly attached thereto by a surface lock a warped layer of insoluble and infusible artificial resin, said layer being thicker in some portions than in others, the thickness of the thicker portions being substantially sufficient to compensate for the warping of the base and the layer.

2. As an article of manufacture a warped base of compressed fibre intermingled with a fusible binder having a relatively low coefficient of expansion, said warped base having firmly attached thereto by a surface lock a warped layer of insoluble and infusible artificial resin, said layer being thicker in some portions than in others, the thickness of the thicker portions being substantially sufficient to compensate for the warping of the base and the layer, and said warped base having firmly attached thereto also a layer of insoluble and infusible artificial resin entirely surrounding the periphery thereof and integral with said first mentioned layer.

HAROLD C. HARVEY.
HUBERT L. BECHER.